United States Patent [19]

Helferich et al.

[11] 4,432,798

[45] * Feb. 21, 1984

[54] ALUMINOSILICATE HYDROGEL BONDED AGGREGATE ARTICLES

[75] Inventors: Richard L. Helferich, Clayton; William B. Shook, Columbus, both of Ohio

[73] Assignee: The Duriron Company, Inc., Dayton, Ohio

[*] Notice: The portion of the term of this patent subsequent to Nov. 2, 1999 has been disclaimed.

[21] Appl. No.: 330,715

[22] Filed: Dec. 14, 1981

Related U.S. Application Data

[63] Continuation-in-part of Ser. No. 217,203, Dec. 16, 1980, Pat. No. 4,357,165, which is a continuation of Ser. No. 908,802, Nov. 8, 1978, abandoned.

[51] Int. Cl.³ .............................................. B28B 7/34
[52] U.S. Cl. .................................. 106/38.3; 106/38.9; 106/84; 164/15; 164/528; 264/63; 501/106; 501/122; 501/127; 501/130; 501/133
[58] Field of Search ................ 106/38.3, 38.9, 84; 501/106, 122, 127, 130, 133; 264/63; 164/15, 528

[56] References Cited

U.S. PATENT DOCUMENTS

| | | | |
|---|---|---|---|
| 2,131,338 | 9/1938 | Vail | 166/292 |
| 2,277,704 | 3/1942 | Kinzie et al. | 106/57 |
| 2,378,927 | 6/1945 | Jewett | 106/74 |
| 2,493,693 | 1/1950 | Parkinson | 106/74 |
| 2,502,418 | 4/1950 | Callis | 106/118 |
| 2,842,444 | 7/1958 | Emblem | 106/38.3 |
| 2,911,311 | 11/1959 | Feagin et al. | 106/38.9 |
| 3,017,677 | 1/1962 | Greenwald | 106/38.3 |
| 3,203,057 | 8/1965 | Hunt et al. | 106/38.3 |
| 3,218,683 | 11/1965 | Nishiyama et al. | 106/38.3 |
| 3,306,758 | 2/1967 | Miller | 106/74 |
| 3,423,216 | 1/1969 | Somers | 106/38.3 |
| 3,600,203 | 8/1971 | Aldera | 106/38.3 |
| 3,804,641 | 4/1974 | Lyass et al. | 106/38.35 |
| 3,804,643 | 4/1974 | Arita et al. | 106/38.9 |
| 3,874,885 | 4/1975 | Lyass et al. | 106/38.9 |
| 3,881,947 | 5/1975 | Palmer | 106/38.35 |
| 3,892,579 | 7/1975 | Mabie | 106/38.3 |
| 3,923,525 | 12/1975 | Toeniskoetter et al. | 106/38.3 |
| 3,930,872 | 1/1976 | Do | 106/38.3 |
| 4,056,937 | 11/1977 | Suzuki | 106/74 |
| 4,070,195 | 1/1978 | Toeniskoetter et al. | 106/38.3 |
| 4,349,386 | 9/1982 | Davidovits | 106/85 |

OTHER PUBLICATIONS

Davis et al., *Jour. of AFS*, "Steel Molding Sands Bonded With Sod. Silicate and Sod. Aluminate", pp. 11–14, Apr. 1964.

*Primary Examiner*—Lorenzo B. Hayes

[57] ABSTRACT

Aggregate-containing products bonded by an aluminosilicate hydrogel are disclosed. A system of two-part mixing and blending of binder components with various granular-like aggregates, modifiers and/or fillers is described in which the resulting compositions are temporarily fluid and formable for short, controllable periods of time but which thereafter become strong, rigid, adherent, erosion resistant composites, requiring little or no external heat supply to achieve full set. The compositions can be formulated for molding on suitable forms or patterns, and may also be prepared in slurry form suitable for spray coating or sealing applications. A wide variety of products can be manufactured of the compositions, including investment molds and cores for foundry use, as well as non-foundry products such as heat and electrical insulators, construction blocks, panels, coating slurries, etc. which may be of essentially solid or foamed (cellular) construction. The novel compositions may be totally inorganic if desired and have advantage in their preparation and use of being non-toxic and environmentally safe, possessing properties of good soundproofing, fire and fluid erosion resistance. The compositions are formulated of readily available, non-critical materials and are correspondingly very cost effective.

23 Claims, 1 Drawing Figure

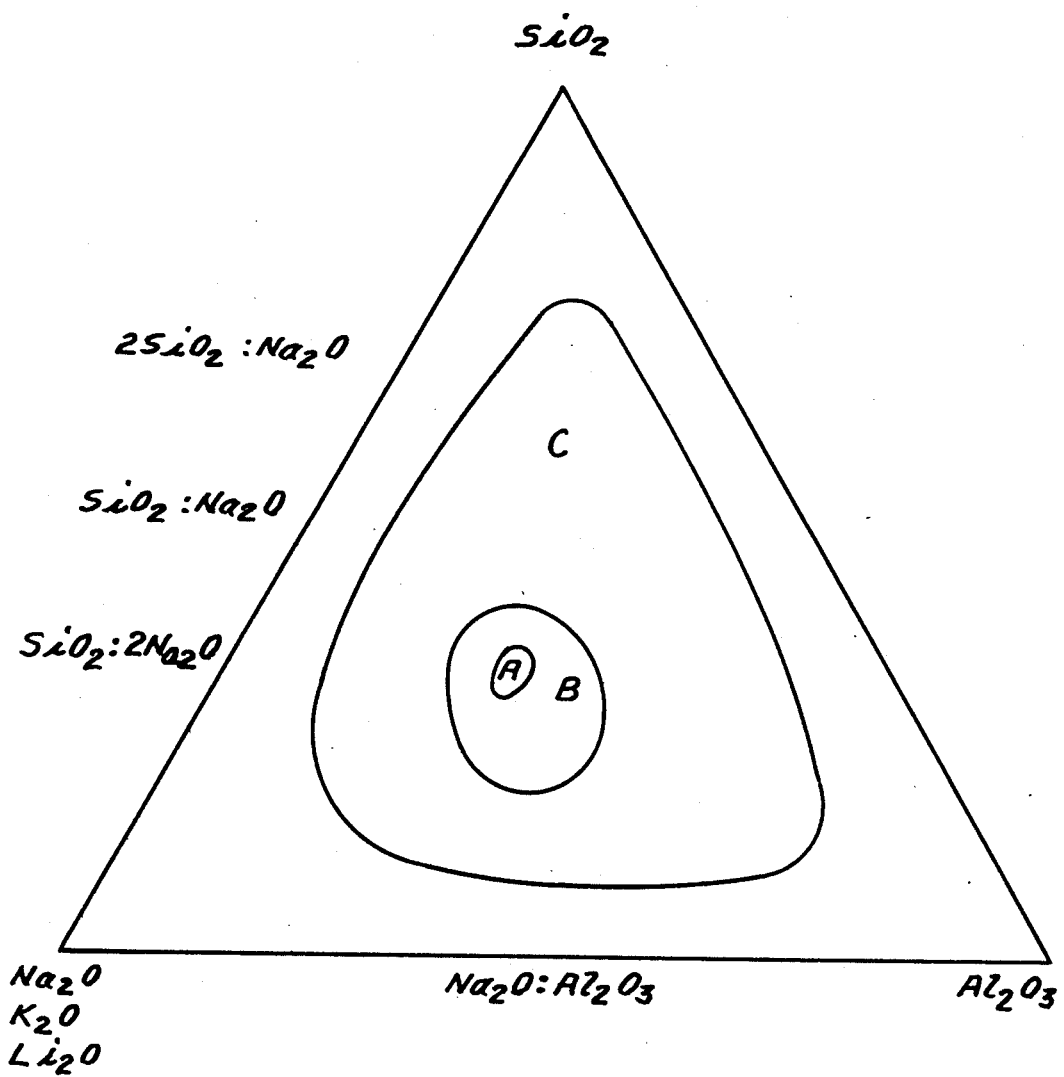

ALUMINOSILICATE HYDROGEL BONDED AGGREGATE ARTICLES RELATED APPLICATIONS

This is a continuation-in-part of our prior application Ser. No. 217,230 filed Dec. 16, 1980, now U.S. Pat. No. 4,357,165 which in turn was a straight continuation of our original Application Ser. No. 908,802 filed Nov. 8, 1978, now abandoned.

BACKGOUND OF THE INVENTION

1. Field of the Invention

The invention relates to moldable, formable or spreadable self-setting compositions consisting of a granular or particulate aggregate constituting a structural or skeletal base which is held together by a unique aluminosilicate hydrogel to form products which quickly set to facilitate handling, and shortly develop full set providing sufficient tensile and compressive strength, thermal properties and fluid erosion resistance. The invention finds application more particularly in the production of (a) formed shapes or products such as investment molds or cores; (b) electrical, thermal and acoustic insulating components; (c) building construction materials; (d) coating, grouting and sealing slurries; (e) low-cost, low-temperature ceramic ware; and (f) fluid micro-filters, to name but a few. The novel compositions have the primary advantage of being fully self-setting in controllably short times under ambient atmospheric conditions, or in some cases with minimal thermal treatments, providing significant energy saving over presently used systems in manufacturing functionally equivalent products.

The novel compositions are notably free of deleterious components that present production hazards in their initial preparation or subsequent use, such as, for example, the evolution of toxic fumes or flammable vapors during manufacture of the products themselves and the curing thereof, or subsequently should the finished products be subjected to high temperatures; e.g., building fire.

2. Discussion of the Prior Art

The prior art literature is replete with proposals for employing silicate binder systems in bonding aggregates for a variety of applications. The principal problems dealt with in the art relate generally to achieving or attempting to achieve objectives, simultaneously, of shorter cure times, greater labor and/or energy efficiency, and environmental acceptability. The present inventors have made an extensive study of the literature available on the subject and have presented in their prior applications referred to above some detailed discussion of it, to which attention is called and the substance of which is expressly incorporated herein by reference. Accordingly the review here is directed more especially to a consideration of those publications which specifically mention compositions containing both aluminates and silicates in an alkaline medium.

In an early patent to Vail, U.S. Pat. No. 2,131,338, he disclosed the use of very dilute aluminate/silicate solutions for impregnating natural earth strata to achieve a long term in situ gelation to bring about improved consolidation of the strata which would otherwise be unsuitable for supporting building structures. The patent states that the resulting consolidation possessed some water resistance and it was accordingly postulated that the solutions might serve to improve water resistance of porous castings, cement blocks and sand molds by impregnating them with the solution. Apparently the suggestion was to impregnate already formed porous products of the type mentioned with the solutions; however the patent gives no examples or details of how the solutions could be so used, or whether the same earth consolidating solution compositions would be empolyed in implementing the suggestion for impregnating proformed articles. In a subsequently published treatise entitled "Soluble Silicates, Their Properties and Uses" (chemistry, Vol. 1, page 236, Reinhold Publishing, 1952), Vail makes reference to forming artificial zeolites "based on a gel obtained by mixing solutions of sodium silicate and sodium aluminate". However that latter publication does not repeat the suggestion in his patent for impregnating porous articles, and the treatise contains no suggestion of using aluminate/silicate solutions for bonding particulate matter together, either to prepare or simply to modify already formed shapes or products of any kind.

A report entitled "Steel Molding Sands Bonded with Sodium Silicate and Sodium Aluminate" by Davis and Lownie, *Journal of AFS*, April 1964, concerns work done at Battelle Memorial Institute on investigating the use of sodium silicate and sodium aluminate as foundry sand binders. In all cases reported, the aluminate was employed only in trace amounts (0.027% by wt.), reliance being placed essentially on the sodium silicate for binding function in the sand mold composition. The report contains no suggestion of any sand mold compositions being developed from this work that would be self-setting; in fact, the conclusion reached was that sand mixes containing the solution were unsatisfactory for foundry mold or any other purpose.

In a later publication entitled "Studies on Alkali Aluminosilicate Hydrogel" by Mitra and Roy, *Trans. of the Indian Ceramic Society*, Vol. XXXI (1972), pages 33–35, 52–56, 82–85 and 87–92, other investigations of sodium silicate and sodium aluminate are reported regarding their use in producing artifical zeolites. Gelation kinetics were studied and maximum gelation rates determined in terms of mole ratios of alumina and silica in the solution. Altough this work is quite definitive on the kinetics of the silicate/aluminate gel formation, and the study includes silica/alumina mole ratio and concentration ranges that are now found useful for binders in making formed shapes of granular or particulate materials, the article deals only with formation of gels for water treatment systems. It appears that the thought of using the gels as binders in making formed shapes of aggregate materials was not considered or apparent to the authors; and even less was there any thought of using the solutions to provide ambient temperature self-setting aggregate compositions for the molding, grouting, coating or sealing applications that are the subject of this invention.

The patent art, other than Vail mentioned above, contains several references to silicate/aluminate compositions. These include U.S. Pat. Nos. 2,378,927, 2,493,693, 2,502,418, 3,306,758 and 4,056,937.

In Jewett U.S. Pat. No. 2,378,927, disclosure is made of roofing shingle materials consisting of colored granules coated with "an inorganic heat reaction product of a silicate, conveniently sodium silicate, and clay, such, for example, as kaolin, bentonite, and the like xxx" which serves to bind the particles to a supporting substrate such as felt paper. The patentee terms his coating a high temperature cement, and in fact it must be heated to high temperature (850° F. and above) to effect any binding capability. Although the patent equates kaolin with sodium aluminate, it contains no suggestion of any solution of silicate and aluminate that is effective as a binder, let alone one that is self-setting at room temperature.

Parkinson U.S. Pat. No. 2,493,693 employs a silicate/aluminate binder for mica splittings. Again however the composition must be substantially heated to initiate its binding effect; in fact care is taken in preparing the bnder from its component solutions to prevent any gelation from occurring. Consequently, the reference teaches away from a self-setting, ambient temperature binder/ aggregate composition.

Callis U.S. Pat. No. 2,502,418 is directed to form heating block compositions utilizing a binder produced by reaction between a soluble alkali metal aluminate (sodium aluminate) and a hydrated alkaline earth oxide (calcium, barium magnesium or strontium oxide or hydroxide) in a highly fluidized slurry of fillers such as asbestor fibers, diatomaceous earth, verminculite and the like. Other cementitious materials such as clay, aluminous cement, basic magnesium carbonate are also included. Since any reaction between the aluminate and earth metal oxides is very slow at best (weeks) under ambient temperature conditions, the patentee teaches only that his composition must be filtered in a press to remove the water, leaving a filter cake or block which must be subsequently dried.

Both Miller U.S. Pat. Nos. 3,306,758 and Suzuki 4,056,937 are concerned exclusively with soil consolidation. Miller discloses binders consisting essentially of alkali metal silicates catalyzed to effect gelation by inclusion of an amide. The objectionable generation of ammonia inherent in this process is suppressed, in accordance with that invention, by the inclusion of an aldehyde such as formaldehyde. The patent mentions that sometimes a supplemental gel accelerating agent is also added. Calcium chloride is preferred as the supplementing agent but amoung a list of possible substitutes, sodium aluminate is mentioned. Suzuki also prepares his soil hardener primarily of a soluble silicate such as water glass, and includes supplemental amounts of an acid reactant in order to achieve a compositional pH that is within a range of weak alkalinity to weak acidity. This is done to reduce possible pollution of subterranean water supplies in case of leaching. The acid reactant generally used is a combination of phosphoric acid and a phosphate salt; however, sodium and potassium aluminate are included in a long list of possible substitutes.

SUMMARY OF THE INVENTION

The commerical implementation and success of the inventors' prior developments of aluminosilicate hydrogel binding agent applicable particularly to production of foundry molds and cores has led to further investigation of that technology in order to extend its use to other foundry and non-foundry applications. The disclosure herein accordingly relates to the inventions involved in the unique combination of factors required to achieve practical, commercially viable aluminosilicate hydrogel bonded aggregate combinations useful for such further applications. As appears more fully below, this objective is accomplished in ways and to an extent not heretofore taught or suggested by the prior art. However it is necessary to observe certain rather important limitations in respect of the components, their concentrations and preparation. When these are observed, the invention provides compositions having rapid but controllable, self-setting capablilities; the compositions are labor saving and cost effective; and they possess unique physical and other properties which enable them to serve practically in applications previously requiring more expensive materials and labor, or having other disadvantages.

The drawing diagram illustrates ranges of the major components (excluding water) of the binder composition itself useful in the practice of the invention. As will be seen, the overall useful ranges comprise about 10–60 weight percent alkali, 10–70 weight percent alumina and 10–80 weight percent silica. This corresponds to a range of mole ratios of alumina to silica of about 0.07 to 4.20. This binder is combined with various types and/or combinations of particulate materials, presently the most commonly used of which from a cost effective standpoint is silica sand, usually in mixtures of coarse and fine grades to achieve optimum compaction densities. Other aggregates and particulate matter can also be used effectively, both singularly or with various combinations of granular materials to achieve specific characteristics in the resultant formed shapes or coatings. Such materials may include common ceramics such as zircon, mullite, fused silica, kyanite, alumina, chromite, rutile, ilmenite, sillimanite, forsterite, olivine, talc, refractory clays, beryl, feldspar, etc. Highly porous and insulating aggregate materials such as perlite, and vermiculite, for example, are also easily bondered with the novel hydrogel binder. The ratio of binder to aggregate varies with the intended application but this binder is always present in amounts greater than 10% and generally about 30% by weight of the total composition. The solids content of the binder itself is about 10 to 50% by weight of its solution when added to the aggregate, depending more particularly on strength requirements. Gel modifiers are very effective for practical purposes, and comprise finely ground clays or alkaline earth materials, principally oxides, hydroxides and carbonates in varying amounts, the total of which comprise a few percent up to about 90% of the weight of the final composition.

As further shown in the drawing, the preferred ranges of the binder components on a weight percent basis are 30–45% total alkali, 20–45% alumina and 20–45% silica, while the corresponding optimum ranges are 35–38%, 27–32% and 27–32%, respectively. A particularly useful binder composition has been identified as having the chemical formula $5.4Na_2O:3Al_2O_3:4SiO_2$. Within the preferred range, gel time and strength are controlled by the alumina/silica mole ratio of the starting solutions, their respective solids content, and mixing temperature. For example, a 1:3(0.33) alumina/silica mole ratio gets within 15–20 seconds using starting solutions of 40–42% by weight solids content in the binder solution itself mixed at an ambient temperature of 70° F. A 4:3(1.33) mole ratio binder solution requires 11–12 minutes for the onset of gelation under similar conditions of solids content and mix temperature. Gel strength is greatest within the optimum compositional range given above (35–38% alkali, 27–32% each of alumina and silica) which corresponds approximately to a 1:2 (0.5) alumina/silica mole ratio mix.

Within the overall workable range of the hydrogel binder system, three zones representing alkaline-rich, colloidal alumina-rich and colloidal silica-rich compositions are also noted in the drawing. Hydrogels produced in these composition ranges do not follow the same gel time and stength relationships as in the preferred range shown in the diagram. Common to both ranges, however, is the ability to use a two-slurry system of formulating first and second component portions of the binder separately with portions of the aggregate which, when combined, will set and form "insoluble" hydrogels bonding the aggregate materials with time.

Principal objectives of the invention include the provision of ambient temperature self-setting aluminosilicate hydrogel bonded composites of low cost aggregate materials for use in molding various shapes including thermal and acoustical insulating products, and in spraying or other coating applications such as in road patching or sealing materials. In the first category the invention can be used for high speed investment casting of molds and cores for metal founding, where the rapid setting invention compositions are substitiuted for the expensive colloidal silica/ethyl silicate system in common use today. The invention is under investigation for making non-combustible foamed products such as brick and other construction block shapes, wall or roofing panels, as well as in the form of sprayable formulations to coat pre-existing structures to improve fire and weather resistance and to impart added strength. A major application currently being investigated involves pumping slurries utilizing the invention concept to seal sewer pipe joints and other potential leak spots.

The invention affords substantial opportunity for increased production rates for appropriate molded products and coating applications, such as just described, with minimum skilled labor and low energy requirements. Since the raw materials use for both binder and aggregate are abundant, non-critical, non-hazardous, non-pollting and low cost, significant advantage is afforded over competing products and manufacturing techniques. Further illustration and description of the invention is given by way of the following examples and in tabulated form below.

DETAILED DESCRIPTION OF THE PREFERRED EMBODIMENTS

The basic procedure involved in preparing the novel compositions for any of the final products or end uses is generally similar to that previously disclosed in our prior applications referred to at the outset of this descussion. Briefly, this comprises preparing separate solutions of sodium aluminate and soidium silicate, each having the desired solids concentration such that when mixed into respectively separate portions of aggregate, the mole ratio of alumina to silica is at a level in the final aggregate/binder mix to produce the desired hydrogel binder properties. It will also be apparent that the total amount of water present, as determined by the solids content of the binder, in relation to the total weight of aggregate is critical in achieving the objects of the invention. As previously disclosed, a procedure for preparing this novel hydrogel binder in low binder/high aggregate compositions was outlined as consisting of a multi-stage, high-speed, high-intensity mixing machine which thoroughly disperses and mixes all materials quickly and effectively. Mixing procedures and equipment for preparing the slurried formulations presented in this current disclosure are also dependent upon the rapid dispersion and mixing of all ingredients. One method successfully used for preparing a mixture containing 30 precent total hydrogel binder and 70 percent particulate matter is based upon a two stage mixing procedure in which two separate slurries of silicate-containing and aluminate-containing mixtures are prepared in the first stage with their combination and mixing conducted in the second or final stage. This final mixing stage can be accomplished in a number of ways including high-speed, high-intensity impeller type mixing systems, motionless mixers, internal nozzle mixing and external nozzle mixing for spray coating applications. Regardless of the mixing system used, uniform dispersion of all components during this final mixing stage is essential. Working time after mixing and before the on-set of gelation in the final composition depends on the alumina/silica mole ratio of the binder and is controllable by proper selection of that ratio within the limits herein defined. Some indication of the gel times has already been given and further information is provided by the examples and tabulations given below.

The procedure currently preferred for preparing the binder employs starting with commercially available grades of alkali metal silicate and aluminate solutions, of which a number are available. For ease of procurement and price effectiveness, the presently preferred sodium silicate water solution has a molar ratio of silica ($SiO_2$) to soda ($Na_2O$) of 2:1. The sodium aluminate water solution currently preferred, has a 1:1 molar ratio of alumina ($Al_2O_3$) to soda. These solutions are introduced during the mixing process in the manner just described to provide the selected alumina/silica ratio to produce a selected gel time, bond strength, etc.

Particularly useful formulations from a cost-effective maximum strength standpoint, comprise a combination of silica sand (70% by weight) and hydrogel binder (30% by weight), the compositional limits of the latter being represented in the accompanying diagram by Area A. Such binder compositions contain approximate mole ratios of alkali/alumina/silica on the order of 2:1:2, and weight ratios of 35–38%, 27–32%, 27–32%, respectively. This composition is easily achieved practically by using relatively inexpensive commercially available sodium disilicate and sodium meta-aluminate solutions in roughly equal weight percentages.

On the next larger area of the drawing, designated Area B which represents the approximate limits of binder composition presently preferred, the compositions comprise insoluble hydrogels that exhibit controlled set times based upon alumina/silica mole ratio in the gel, similar in this respect to gels of those represented by Area A. For exmaple, a 1:3 (0.33) alumina/silica mole ratio gels within 15–20 seconds at room temperature, while a 4:3 (1.33) ratio system requires 11–12 minutes after mixing before the onset of gelation. Gel strength, as represented by MOR (modulus of rupture) values of the final composite, is also controlled by the alumina/silica ratio, with the 1:2 (0.5) ratio being strongest, and decreasing in those of higher alumina content; e.g. mole ratios of 1:1 to 4:3 (1–1.33) being weaker.

Binder compositions falling outside the preferred Area B but within the limits of the encompassing area designated Area C on the drawing possess lower gel stengths, at least initially, but do in time exhibit waterproof characteristics similar to compositions within the preferred area. Gel times generally are much longer. In this area, compositions at the higher silica and alumina levels are colloidal prior to mixing and react differently from the soluble silicates, providing initially weak gels that do not actually set (that is, do not obtain sufficient handling strength in compositions formed of them) for over 24–48 hours. Even compacts formed of these colloidal forms of silicate and aluminate, however, while still quite soluble prior to set, do ultimately attain insolubility and high MOR values. Alkaline silicates and aluminates other than those of sodium that are useful in preparing the binder include potassium and, to a sometimes important extent but only in partial substitution of sodium and potassium, is lithium. Substantial improvement in water resistance is achieved with potassium substituted for some or all of the sodium salt, and the same is especially true with partial substitutions of lithium containing compositions.

It order to demonstrate further the effects of compositional changes in the novel hydrogel binder or aggregate-containing compacts, variations in the amount and type of alkali, alumina and silica of the gel have been investigated. Three categories or general areas tried are the following:

1. The so-called "standard" system using sodium silicates of varying silica-to-soda ratios and sodium aluminate of varying alumina-to-soda ratios.
2. A modified system substituting potassium and/or lithium for the sodium portion of the hydrogel.
3. A further modified system substituting colloidal silica and/or colloidal alumina as the source of soluble silica and alumina.

The diagram summarizes the results which are further exemplified by the data tabulated in Table I hereof.

The invention hydrogen binder formed from alkaline silicate and aluminate solutions in the preferred compositional range (Area B) is insoluble in water upon gelation. However, not all of the available alkali becomes combined in the resultant alkaline aluminosilicate hydrogel. During synersis, in which the shrinking gel "squeezes" out a liquid phase (very common in silicate gel chemistry) this excess alkali may be observed. Since the invention hydrogel is used as a bonding medium for aggregate material, this exuded alkali can easily become trapped in the "set" or final product. Upon drying of the bonded shapes, the excess alkali becomes hygroscopic and upon subsequent exposure of the finished product to water or high humidity, the excess alkali swells, mechanically destroying the bond, thus limiting the long term strength and water resistance of the bonded shapes. In order to prevent or minimize this problem, the invention includes incorporating gel modifiers or subjecting the compacts to processes which are effective to minimize hydrogel bond shrinkage, or to either remove or "tie-up" the excess alkali.

TABLE I

EXAMPLE HYDROGEL COMPOSITIONS AND RESULTANT COMPACT PROPERTIES USING A 30 WEIGHT PERCENT BINDER LEVEL AND SILICA SAND (49%) AND SILICA FLOUR (21%) AGGREGATES

| EXAMPLE No. | GENERAL REGION | HYDROGEL COMPOSITION (SOLIDS ONLY) | | | | NOMINAL[1] WORK TIME | MODULUS OF RUPTURE (MOR)[2] | |
|---|---|---|---|---|---|---|---|---|
| | | Alkali (Wt. %) | Alumina (Wt. %) | Silica (Wt. %) | MOLE RATIO Alkali/Al$_2$O$_3$/SiO$_2$ | | 1 DAY (psi) | 7 DAY (psi) |
| 1 | OPTIMUM | 37.3 | 28.8 | 33.9 | 2.1/1.0/2.0 | 2 min | 392 | 477 |
| 2 | OPTIMUM | 37.8 | 31.1 | 31.1 | 6.0/3.0/5.0 | 2¼ min | 475 | 360 |
| 3 | PREFERRED | 38.1 | 34.7 | 27.2 | 5.4/3.0/4.0 | 4 min | 390 | 305 |
| 4 | PREFERRED | 39.1 | 33.9 | 27.0 | 5.7/3.0/4.0 | 2¼ min | 529 | — |
| 5 | ALKALINE-RICH | 53.5 | 23.3 | 23.3 | 8.3/3.0/4.0 | 2 min | 239 | 197 |
| 6 | COLLOIDAL SILICA-RICH | 24.9 | 34.6 | 40.5 | 1.2/1.0/2.0 | 2 days | — | 436 |
| 7 | COLLOIDAL SILICA-RICH | 10.1 | 13.2 | 76.7 | 1.3/1.0/10.0 | 1 day | — | 142 |
| 8 | COLLOIDAL ALUMINA-RICH | 10.2 | 69.4 | 20.4 | .48/2.0/1.0 | ~.3 min | 18 | — |

[1] Nominal work time is defined as that time prior to gelation where the mix is still sufficiently fluid to shape, pour, spread or spray
[2] ASTM C674

A number of approaches to this problem have been investigated, of which the following general categories are representative:

1. Addition of clay or clay-like materials to the composite mix.
2. Addition of alkaline earth compounds (barium, calcium, etc.) less soluble than those present in the "standard" silicate and aluminate solutions.
3. Addition of compounds capable of forming insoluble sodium (or potassium) salts, such as zinc, titanium, etc.
4. Treating the finished bonded or formed shapes either by a simple leaching step, or by an ion exchange process.

Clay and clay-like materials generally include the group consisting of kaolins (raw and calcined), bentonites, fire clay, ball clay, etc. As a general rule, these materials increase the short term, air dried and baked strength of bonded aggregates by controlling excessive gel shrinkage during the cure process. They are particularly useful in combination with other modifiers/fillers. Example properties of various compositions are shown in Table II.

Alkaline earth materials include compounds (primarily oxides) formed from Group II elements of the Periodic Table, including calcium, strontium, barium and even beryllium, magnesium and radium are possibilities. Also compounds from Group III elements such as boron, aluminum, etc., while not considered alkaline-earths, improve bonded aggregate properties. Substantial improvement is realized when this group of modifiers is included along with clays such as calcined kaolin clay.

TABLE II

EXAMPLE MIX COMPOSITIONS AND RESULTANT PROPERTIES OF DURCOSET HYDROGELS ($5.4\ Na_2O:3Al_2O_3:4SiO_2$) MODIFIED WITH VARIOUS COMPOUNDS TO IMPROVE STRENGTH AND WATER RESISTANCE

| MODIFIER GROUP | EXAMPLE No. | TOTAL BINDER (%) | MODIFIER TYPE | MODIFIER (%) | SILICA FLOUR (%) | SILICA SAND (%) | WORK TIME (min) | 1 DAY AIR DRY (psi) | 7 DAY AIR DRY (psi) | AIR DRY & BAKED (psi) | WASH AIR DRY BAKED (psi) | "BEST" AFTER WET/DRY CYCLE (psi) |
|---|---|---|---|---|---|---|---|---|---|---|---|---|
| STANDARD | 3 | 30 | NONE | — | 21 | 49 | ~4 | 393 | 305 | — | 292 | 0 |
| CLAY TYPE | 9 | 30 | CALCINED KAOLIN[1] | 10.5 | 10.5 | 49 | ~3½ | 476 | 393 | — | 445 | 389 |
|  | 10 | 30 | Na Bentonite | 5 | 16 | 49 | ~5 | 126 | 462 | — | 137 | — |
| ALKALINE EARTH TYPE | 11 | 30 | $BaCO_3$ | 10.5 | 10.5 | 49 | ~6¼ | 380 | *6 | — | 402 | 340 |
|  | 12 | 30 | $CaCO_3$ | 10.5 | 10.5 | 49 | ~5¼ | 844 | 335 | — | 241 | 46 |
|  | 13 | 30 | Wollastonite | 10.5 | 10.5 | 49 | ~3¼ | 354 | 385 | — | 395 | 422 |
|  | 14 | 30 | Calcium Borate | 10.5 | 10.5 | 49 | ~1¼ | 544 | 522 | — | 159 | 202 |
| POTENTIAL INSOLUBLE SODIUM SALT FORMERS | 15 | 30 | ZnO | 2.6 | 18.4 | 49 | ~3 | 374 | — | 348 | 460 | — |
|  | 16 | 30 | ZnO | 5.25 | 15.75 | 49 | ~3¼ | 488 | 411 | 446 | 537 | 238 |
|  | 17 | 30 | $TiO_2$ | 10.5 | 10.5 | 49 | ~2¼ | 320 | 598 | — | 526 | 202 |
|  | 18 | 30 | $ZrO_2$ | 10.5 | 10.5 | 49 | ~3¼ | 385 | 248 | — | 452 | — |
| COMBINATIONS INCLUDING GLOMAX CALCINED KAOLIN CLAY[2] | 19 | 343 | ZnO/Clay | 17.5 | — | 51.2 | ~3 | 458 | 512 | 443 | 450 | — |
|  | 20 | 343 | $TiO_2$/Clay | 17.5 | — | 51.2 | ~3 | 359 | 556 | 448 | 751 | — |
|  | 21 | 30 | Wollastonite/Clay | 21 | — | 49 | ~2 | 433 | 682 | — | 492 | 554 |
|  | 22 | 30 | Calcium Borate Art Clay | 16 | — | 54 | ~2¼ | 534 | 522 | 311 | 291 | — |
|  | 23 | 30 | Wollastonite $BaCO_3$ Clay | 7% EA | — | 49 | ~2¼ | 522 | — | 1456 | — | 950 |

[1] Glomax is a tradename of Georgia Calcined Kaolin clay
[2] Work time is defined as that time prior to gelation that binder is sufficiently fluid to form, pour, spread or spray Typical examples are shown in Table II from which it can be seen that there is a relative improvement effected by the combination. See for example the improvement represented by Example 23 which combined wollastonite (fibrous calcium silicate), barium carbonate and "Glomax" clay. The initial MOR strength of this formulation after one day air drying was 522 psi (after one day air dried and baked it was 1086 psi), as against a non-modified composition such as that of Example 3 included in Table II for comparison. Even more importantly, this strength is maintained after alternate wet and dry cycling, evidencing a good waterproof bond. Recent work has also determined that another very promising gel modifier imparting improved MOR strength and water resistance is lithium tetraborate. Although not included in Table II, available data on this inclusion show that in a roughly 70% silica sand/silica flour aggregate, 30% hydrogel binder composition, inclusion of 2% lithium tetraborate gives a one-day strength (no bake) of about 811 psi (MOR).

Compounds forming insoluble sodium salts such as zinc, titanium and zirconium when incorporated as modifiers also significantly improve strength and water resistance. Again, these materials in oxide or carbonate form, when added with calcined kaolin clay, provide additional improvements greater than either modifier added alone, as shown by the examples in Table II.

In place of or in addition to the incorporation of modifiers of the type discussed above, the rigidified (formed) shapes can be processed to leach out the soluble soda of the hydrogel by taking advantage of the natural solubility of alkali in water (i.e., by a flowing water bath treatment), or by enhancing such removal by application of an electromotive driving force (i.e., electrodialysis). Typically the starting hydrogel solutions used in practice contain some excess alkali vis-a-vis the resulting bonding gel composition. This is done to provide a mass-action effect and/or to compensate for less than perfect reaction. This excess remains in the formed shapes and becomes the cause of long term degradation, as previously explained. Its removal therefore improves strength and stability of the bond with respect to water resistance. A similar process involves subjecting the formed shapes in baths containing potential anion/cation exchange solutions, wherein the alkaline ions are exchanged with zinc, calcium or other ions more insoluble in subsequent exposure. The accompanying Table III lists example properties resulting both from simple water leaching and/or exposure to ion exchange solutions.

In table IV, the effect is shown of the solids content of the binder on the modulus of rupture of formed shapes in which the different binders are employed. The binders were prepared of sodium disilicate and sodium meta-aluminate solutions (41.1% and 58.9%) except that in Examples 31 and 32, lithium carbonate (about 3%) was added to the silicate. Water was added to adjust the solids content in the several examples for this comparison. The aggregate employed was 70% silica sand, 15% wollastonite and 15% calcined kaolin clay. The baking referred to comprised an overnight treatment at 80° C., followed by 1 hour at 220° C. The wash cycle comprised soaking the formed shapes overnight in flowing tap water followed by air drying prior to the same bake cycle just described.

EXAMPLE 33

The inorganic and rapid setting nature of the invention hydrogel binder/aggregate combinations make them suitable for the currently used but expensive colloidal silica/ethyl silicate bonded compositions in the manufacture of investment type foundry molds and cores in both the full and shell mold concept. Using the invention, a full mold process of the type used in plaster molding of aluminum incorporates a mold composition having a 30% hydrogel binder content and suitable

TABLE III

EXAMPLE PROPERTIES RESULTING FROM SODIUM LEACHING AND/OR ION/CATION EXCHANGE MECHANISM ON DURCOSET HYDROGEL FORMED SHAPES

| EX- AMPLE No. | MIX COMPOSITION ||||| STANDARD[1] MODULUS OF RUPTURE (MOR) || EFFECT OF LEACHING/EXCHANGE ||| 
|---|---|---|---|---|---|---|---|---|---|---|
| | TOTAL BINDER (%) | MODIFIER TYPE | % | SILICA FLOUR (%) | SILICA SAND (%) | 1 DAY (psi) | 7 DAYS (psi) | TREATMENT | MOR STRENGTH (psi) AFTER[1] TREATMENT | AFTER WET/DRY CYCLE |
| 1 | 30 | None | — | 21 | 49 | 392 | 477 | OVERNIGHT RINSE FLOWING TAP WATER | 456 | (FAILED) |
| 2 | 30 | None | — | 21 | 49 | 475 | 360 | OVERNIGHT RINSE FLOWING TAP WATER | 505 | (FAILED) |
| 2a | 30 | None | — | 21 | 49 | 475 | 360 | OVERNIGHT RINSE IN FLOWING TAP WATER PLUS BAKING | 422 | 196 |
| 3 | 30 | None | — | 21 | 49 | 390 | 305 | OVERNIGHT RINSE FLOWING TAP WATER | 476 | (FAILED) |
| 3a | 30 | None | — | 21 | 49 | 390 | 305 | CALCIUM CHLORIDE SOAK AFTER GELATION RINSED AND BAKED | 304 | TEST INCOMPLETE |
| 21 | 30 | Wollastonite & Glomax | 21 | — | 49 | — | 686 | OVERNIGHT RINSE FLOWING TAP WATER AND BAKED | 492 | 554 |
| 24 | 30 | ZnO | 10.5 | 10.5 | 49 | — | 564 | ZINC CHLORIDE RINSE AFTER GELATION RINSED AND BAKED | 537 | TEST INCOMPLETE |
| 19 | 31.3 | ZnO/ Glomax | 17.5 | — | 51.2 | — | 512 | ZINC CHLORIDE RINSE AFTER GELATION, RINSED AND BAKED | 371 | TEST INCOMPLETE |
| 25 | 30 | Spondemens | 10.5 | 10.5 | 49 | 539 | 310 | OVERNIGHT RINSE IN FLOWING TAP WATER AND BAKED | 440 | 342 |

[1]ASTM C674

TABLE IV

EFFECT OF HYDROGEL SOLIDS CONTENT ON MODULUS OF RUPTURE VALUES FOLLOWING VARIOUS CURE TREATMENTS
(5.4 $Na_2O$: 3.0$Al_2O_3$: 4.0 $SiO_2$)

| EXAMPLE No. | HYDROGEL BINDER || WORK[1] TIME (min) | MODULUS OF RUPTURE (MOR)[2] |||
|---|---|---|---|---|---|---|
| | TOTAL (Wt %) | SOLIDS (Wt %) | | 1 DAY AIR DRY (psi) | 1 DAY AIR DRY/BAKE (psi) | WASH AIR DRY/BAKE (psi) |
| 26 | 30 | 22 | ~½ | — | — | — |
| 27 | 30 | 30 | 1 | 248 | 425 | 455 |
| 28 | 30 | 35 | 1½ | 334 | 540 | (130) |
| 29 | 30 | 37 | 2 | 440 | 480 | 388 |
| 30 | 30 | 40 | 2½ | 554 | 573 | 573 |
| 31 | 30 | 42 | 3 | 443 | 742 | 804 |
| 32 | 30 | 37 | 2 | 238 | — | 648 |

[1]Work time defined as that time prior to gelation that binder is sufficiently fluid to work
[2]ASTMC674

As illustrations of practical applications of the novel aluminosilicate hydrogel/aggregate compositions discussed above, the following examples are representative.

aggregate (mullite, fused silica, zircon, etc.) to pour cope and drag mold halves and cores. For steel castings the molds are air dried overnight and then baked to remove moisture to acceptable levels, very similar to the handling of conventional plaster. Especially formulated compositions may even be immediately fired at 1800° F. directly after the "set" has occurred. Pour off may be accomplished while the molds are still hot from the firing process, thereby providing a very rapid turnaround from molding to investment casting. A typical formulation for this purpose employs:
11% sodium disilicate (50° Baume)
16% sodium meta-aluminate (50° Baume)
3% water
5% calcined kaolin clay
15% fused silica powder
50% coarse grain fused silica
The resulting molds and cores develop MOR's in excess of 500 psi after suitable air drying and baking. Retained moisture levels are controllable through firing temperatures and can be typically below 0.05% when fired above 1000° F. Total shrinkage can be controlled between 0.1 and 1% depending on aggregate distribution and firing procedures. Core removal through standard shakeout or salt bath treatments is comparable to that of colloidal silica/ethyl silicate bonded molds and cores.

EXAMPLE 34

The invention is useful in producing lightweight foamed products that are noncombustible, and thermally and acoustically insulating. Typical foaming techniques conventionally used for organic resinous (polyurethane) and for inorganic silicate systems are applicable here with slight modifications. Since the aluminosilicate gel of the invention is a fairly viscous liquid prior to the onset of gelation, bubbles that can be created in it by mechanical agitation are entrapped by the forming hydrogel and provide a typical cellular structure in the finished product. Other methods of inducing a foamed structure already known to the art may also be used, such as incorporation of a gassing agent or reactant. For example, materials known to intumesce with alkaline hydroxides, such as ground silicon and silicon alloys, aluminum powder, sodium borohydride, and others can be used. Peroxy compounds of the type previously employed in silicate foaming will also intumesce with the alkaline silicate ingredients of the invention binder system prior to gelation to effect the desired cellular nature of the formed shapes. Still another method of achieving such a product structure under the present invention is to incorporate a lightweight filler such as expanded vermiculite or perlite with the aluminosilicate binder. The various other modifiers already discussed can also be added for achieving the enhanced strength and water resistance they provide in those other systems. These are the finely ground clays and/or various compounds containing calcium, zinc, boron, etc.

Because of the fast setting nature of the invention systems, the above techniques not only apply to the production of "formed shapes" (i.e., discrete articles), but also to foamed-in-place products such as insulating coatings applied, as by spraying for example, to existing structures. A common method of applying acoustical insulation to a structure is to combine perlite with a resinous or a hydraulic setting binder such as cement or plaster. Compositions with perlite incorporating the invention offer a very suitable substitute. A typical formulation for this has the following composition:

72 pbw sodium disilicate
60 pbw sodium meta-aluminate
68 pbw water
125 pbw perlite
The foregoing composition will also provide a shape of low density (less than 15 lb/ft$^3$) and sufficient MOR strength to be useful in producing insulating board or panels.

EXAMPLE 35

While the above composition can be used with additional trapped air introduced by mechanical agitation prior to application, the addition of finely ground silicon or aluminum metal will impart further advantages by forming entrained hydrogen bubbles from the reaction of these specific metals with the alkaline hydrogel binder.

A particularly useful aspect of the foam hydrogel products is their use in producing lightweight refractory shapes for metal founding purposes. Such shapes as foundry molds and cores can be produced that have a thin, smooth, dense exterior skin with a low density cellular interior. Compositions employing suitable aggregate materials can be used for ferrous and non-ferrous castings alike and display excellent casting surface finishes and relative easy knockout properties. A typical formulation for this purpose employs:
30 pbw invention aluminosilicate hydrogel binder (30% solids)
5 pbw reactive alumina
45 pbw ground calcined kyanite
19 pbw coarse calcined kyanite
1 pbw aluminum metal powder
By casting the above slurry composition in a warm mold that has been surface treated with an anti-foaming agent, low density shapes of 40–50 pounds per cubic foot are obtained after firing at 1800° F. Volumetric shrinkages less than 0.5% are achieved and coupled with their suitable hot compressive strength of 250 psi, provide good dimension reproducibility in steel castings.

EXAMPLE 36

Another insulating composition employing modifiers for improved strength and water resistance by the addition of calcium, zinc, boron compounds, etc., without the perlite, and substituting aluminum powder for bubble formation, is the following:
200 pbw invention aluminosilicate hydrogel binder (40% solids)
2.5 pbw lithium carbonate
20 pbw calcined kaolin clay
20 pbw wollastonite
20 pbw barium carbonate
2.5 pbw aluminum metal (powder)
The resulting composition has a very low density (about 10 lbs/ft$^3$), and its strength and thermal insulating properties are quite attractive for commercial applications as coatings.

EXAMPLE 37

Building construction materials requiring good water resistance and high structural strength can be made economically at high production rates using the principles of the invention. In general, incorporation of modifiers of the type already discussed, and a low temperature thermal treatment of the final products, are recommended for this type of use. The following composition provides a specific example:

30 pbw invention aluminosilicate hydrogel binder (42% solids)
1 pbw lithium carbonate
6 pbw wollastonite
6 pbw calcium carbonate
50 pbw coarse silica sand The foregoing composition, using an alumina/silica mole ratio of 3:4 in the hydrogel binder, sets in approximately 3 minutes after mixing. Air curing followed by a one hour soak per inch of thickness of 225°-250° C. further strengthens and waterproofs the compact. The MOR of this product is around 1100 psi, exceeding the ASTM requirements for below-grade building materials (600 psi) by almost two-to-one. Tests made on the product show that this strength level is maintained in subsequent wet and dry cycles. Above-grade ASTM requirements (only 300 psi) can be most readily and economically met by reducing the solids level of the hydrogel binder to 30% from the 42% level given in the specific formulation above. This also results in improved thermal insulating values.

EXAMPLE 38

The foregoing building construction material system can be combined with the in-place foaming techniques mentioned before to provide a means of forming a building structure by spraying a fast-setting foaming composition on an inflatable balloon type form. Just as others have produced structures using urethane materials, the same application technique can be used with the invention compositions, which are not subject to the potential hazard of toxic fume generation in the event of a fire in a building constructed of the organic (urethane) material.

EXAMPLE 39

The inorganic, rapid-setting characteristic of the novel hydrogel bonded composites lends itself well to various grouting or sealing applications. One particular application involves sealing the soil surrounding a leak in an underground sewer pipe. Previously used polymer chemicals employed for this purpose have had to be removed from the market because of potential environmental and/or health hazards introduced by them. Although it has long been recognized (see Vail 2,131,388 and other prior patents discussed above) that inorganic silicate systems should provide an excellent answer, none of the silicate systems heretofore proposed has fully satisfied the needs. Aluminosilicate hydrogel-based systems in accordance with this invention offer considerable promise, more particularly those employing potassium and/or lithium silicates in their formulation which exhibit remarkable water resistant properties over the standard sodium-containing counterparts. A typical system of the invention employs the dual (two-part) slurry approach disclosed above, but using potassium-based silicate and aluminate, respectively. The potassium silicate slurry incorporates a small amount of lithium carbonate (3% based on silicate) and finely ground clay (1-20% based on silicate), and a further modifier (1-20% based on silicate) from the group consisting of zinc, titanium, zirconium, calcium, barium, boron and magnesium compounds (as oxides, carbonates and/or hydroxides). Similarly, the potassium aluminate component contains the same clay (1-10% based on aluminate) and a modifier from the same group mentioned above (zinc, titanium, etc. compounds), also at the same level (1-20% based on aluminate). This dual slurry is applied by pumping it into the leak, using a specially designed delivery system capable of rapidly mixing the two slurry components together just prior to injection in the leaking or cracked area of the pipe. The slurry formulation is selected to cause gelation to occur within 60 seconds after dispersion, with the resultant product being completely insoluble at that time. Gelled strength depends on the nature of the aggregate or soil surrounding the pipe, but generally exceeds 100 psi compressive strength and a MOR of 100 psi within the first 24 hours. An example of the make-up of a suitable two-part slurry supplying these results is the following:

|  | Silicate Component | Aluminate Component |
| --- | --- | --- |
| Solids Component (pbw) | 44 | 45 |
| Water (pbw) | 100 | 101 |
| Solution Solids (%) | 30 | 30.1 |
| Viscosity (cps) | 44 | 50 |

The final solids content of this binder system is about 30%, and the gel time is about 50 seconds.

EXAMPLE 40

Low temperature refractory shapes can be made from suitable refractory aggregates in a manner similar to that employed in Example 37. The limiting factor with regard to refractoriness of the final shapes depends not only on the refractoriness of the aggregate material but of the bond, in which case the nature and amount of retained (uncombined) alkali (after treatments to remove it) plays a significant role. The so-designated "standard" aluminosilicate hydrogel bonds discussed above contain, initially 30-40% alkali ($Na_2O$, $K_2O$, $Li_2O$), all of which are powerful fluxes and will decrease the softening temperature of the bonded aggregate complex if appreciable excess remains. It is important therefore to use one or more of the techniques disclosed above to reduce any excess to as low a level as possible. A typical process flow based upon the following initial compositions is described below:

|  | Composition |
| --- | --- |
| 30 pbw | invention aluminosilicate hydrogel (42% solids) |
| 10 pbw | calcined kaolin clay |
| 10 pbw | finely ground mullite |
| 50 pbw | coarse mullite |

After forming, the compact is cured for about 24 hours (room temperature), followed by leaching in flowing tap water (typically 1-2 days) to remove excess sodium ions. The compact is then placed in a calcium or aluminum chloride bath to exchange, in zeolite fashion, as many of the alkali for calcium or aluminum ions as possible. The compact is again rinsed, this time to remove trapped alkaline chloride. After air curing and drying, a low temperature baking treatement is employed to slowly remove the remaining moisture. Temperatures under 1000° F. are then used in an added bake to reduce even further or to eliminate all moisture prior to use of the resulting ceramic compact at elevated temperatures, which can be in the 2300°-2500° F. range.

EXAMPLE 41

Using low-binder-solids-content (or low binder levels of high solids content) hydrogels of the invention, loosely bonded formed shapes of relatively low strength and high porosity can be made for subsequent impregnation by organic resinous materials, or inorganic "ceramic" materials, to fabricate high strength composite shapes. For example, a sand and/or fiber-containing structure (such as a kitchen or laundry sink) can be built in this way, allowing it to set to a reasonable handling strength using highly automated production techniques and equipment. Upon curing, the compacts are dipped or sprayed with a resinous material (e.g., polyester or epoxies), providing an impervious seal around the shape. "Sandwich" structures of this kind (i.e., laminates of a core and facing sheet or sheets) are known to display strength levels superior to compacts made from the same materials in straight mix and cast forms.

EXAMPLE 42

Another characteristic of the invention hydrogel binder/aggregate system of particular importance centers on its potential use in producing low cost fibrous materials suitable for both thermal and acoustical insulation applications. During the gelation period, the increased viscosity observed prior to set is very similar to the viscous state achieved in molten ceramic and glass materials used in the production of ceramic and glass fibers. Conventional means of fiber manufacturing such as spinning, blowing, extruding, etc. can be incorporated with the invention hydrogel modified to include a continuous mixing stage to provide the material at proper consistency. Further processing to reduce the soluble alkali content can also be incorporated to enhance fiber stabilty and refractoriness for specialized applications. Typical compositions containing finely ground aggregate materials such as calcined clays, zinc oxide, wollastonite, calcium or barium carbonate, etc. are incorporated as filler materials in varying amounts to improve rigidity and strength as previously discussed elsewhere in this disclosure.

EXAMPLE 43

An alternate forming technique based upon the rheopectic-like nature of the invention aluminosilicate hydrogel binder/aggregate combinations produced from low solids content starting solutions of silicate and aluminate (less than 25-30% solids levels) has been found to be very useful in forming intricate shapes difficult to obtain by other means. A typical composition employs:

| 200 pbw | invention aluminsolicate hydrogel (25% solids) |
|---|---|
| 20 pbw | calcined kaolin clay |
| 400 pbw | mullite refractory (sized to 100-200 mesh) |

The above material in the set or "gelled" condition displays rheopectic-like characteristics when subjected to vibrational forces; i.e., the gelled structure flows under vibration to fill narrow cavities and passages retaining this new shape once the vibrational action is removed. Shapes formed by this technique can then be subjected to a baking operation to lower the water content thereby finalizing rigidification.

The invention has been described and illustrated in terms of the foregoing examples. It is apparent that many changes can be made in the details of the illustrations based on the inventive concept and such changes and equivalents as properly fall within the scope of the appended claims are accordingly intended to be covered.

What is claimed is:

1. Rigidified formed articles of aggregate/binder compositions which are at least sufficiently fluid or plastic when prepared to enable them to be formed into said article and which are self-setting under ambient conditions to effect rigidification thereof, said composition comprising an inert aggregate material, more than 10% by weight of an aluminosilicate hydrogel binder bonding said aggregate material together to form said rigidified article, and at least one gel modifying filler selected from the group consisting of clays, compounds of Group II and III metals of the period and zinc, zirconium and titanium compounds which form insoluble alkali salts with said binder, said aggregate material principally comprising discrete particulate matter which when bound together in said rigidified condition constitutes the skeletal base of said articles, said aluminosilicate hydrogel binder having compositional limits, exclusive of its water content, of from 10-60 weight percent total alkali, 10-70 weight percent alumina and 10-80 weight percent silica, wherein the mole ratio of alumina-to-silica is from 0.07 to about 4.20, a total solids content of said binder of 10-50 weight percent, the balance essentially water.

2. Rigidified formed articles as defined in claim 1, wherein the compositional limits of the binder, exclusive of water, are 30-45 weight percent total alkali, 20-45 weight percent alumina and 20-45 weight percent silica, and wherein the mole ratio of alumina-to-silica is from 0.33 to 2.0, a total solids content of about 30-45 weight percent, balance water.

3. Rigidified formed articles as defined in claim 1, wherein the compositional limits of the binder exclusive of water, are 35-38 weight percent total alkali, 27-32 weight percent alumina and 27-32 weight percent silica, wherein the mole ratio of alumina to silica is from about 0.40 to 1.00, a total solids content of 10-50 weight percent, balance water.

4. Rigidified formed articles as defined in claim 3, wherein the hydrogel binder composition is chemically represented by the formula $5.4Na_2O:3Al_2O_3:4SiO_2$.

5. Rigidified formed articles as defined in claim 1, wherein said aggregate material is composed of about 49% silica sand, 21% ground silica flour based on the total aggregate binder composition weight; and the binder composition comprises sodium disilicate and sodium meta-aluminate solutions in the relative weight ratios of 41.1% and 58.9% based on the initial solutions thereof.

6. Rigidified formed articles as defined in claim 1, wherein said aggregate material is composed of about 49% silica sand, 21% silica flour based on the total aggregate/binder composition weight; and the binder composition comprises said hydrogel wherein the mole ratio of total alkali to alumina to silica is about 2.1:1:2.

7. Rigidified formed articles as defined in claim 1, wherein said aggregate material is composed of about 49% silica sand, 21% silica flour based on the total aggregate/binder composition weight; and the binder composition comprises said hydrogel wherein the mole ratio fo total alkali to alumina to silica is about 6.0:3:5.

8. Rigidified formed articles as defined in claim 1, wherein said aggregate material is composed of about 49% silica sand, 21% silica flour, based on the total aggregate/binder composition weight; and the binder composition comprises said hydrogel wherein the mole ratio of total alkali to alumina to silica is about 5.4:3:4.

9. Rigidified formed articles as defined in claim 1, wherein said aggregate material is composed of about 49% silica sand, 21% silica flour, based on the total aggregate/binder composition weight; and the binder composition comprises said hydrogel in the mole ratio of total alkali to alumina to silica is about 5.7:3:4.

10. Rigidified formed articles as defined in claim 1, wherein the aggregate material is a granulated particulate matter selected from the group consisting of quartz sand, zircon, olivine, chromite, fused silica, mullite, kyanite, alumina, sillimanite, forsterite, talc, calcined refractory clays, rutile, ilmenite, beryl, zirconia, zinc oxide and mixtures thereof.

11. Rigidified formed articles as defined in claim 1, wherein the aggregate material is a porous, insulating type material selected from the group consisting of diatomaceous earth, vermiculite, expanded perlite, bubble alumina, cellular glass, pumice and mixtures thereof.

12. Rigidified formed articles as defined in claim 10, wherein said aggregate comprises up to 90% of the total weight of said shapes and coatings.

13. Rigidified formed articles as defined in claim 1, wherein the alkali component of the binder is selected from the group consisting essentially of aqueous solutions of sodium, potassium and lithium silicates and aluminates and combinations thereof.

14. Rigidified formed articles as defined in claim 1, wherein the gel modifying filler is selected from the group consisting of: oxides, carbonates, silicates and borates of calcium, strontium, barium, beryllium, magnesium and aluminum.

15. Rigidified formed articles as defined in claim 14, wherein said aggregate comprises about 70% of the total weight of said aggregate/binder compositions wherein said aggregate comprises approximately 50% by weight silica sand and the balance silica flour.

16. Rigidified formed articles as defined in claim 1, wherein excess alkali from the hydrogel portion of said formed shape has been extracted to improve the water resistance and refractoriness of said shapes and coatings.

17. Rigidified formed articles as defined in claim 1, fired at a suitabletemperature to effect a refractory metal founding mold.

18. The method of preparing rigidified formed articles of aggregate-binder compositions according to claim 2, wherein said method comprises
as a first step, preparing separte aggregate-containing slurries of silicate-containing and aluminate-containing solutions, respectively, which when combined react to produce an alumino silicate hydrogel binder that is self-setting under ambient conditions to bond said aggregate together in rigidified condition, and
as a second step, effecting the rapid intermixing of said aggregate/binder components to achieve a thoroughly homogeneous combination thereof and promptly forming said articles of said combined components;
wherein said aggregate consists essentially of discrete particulate matter which, when bound together in said rigidified condition constitutes the skeletal base of said articles and
where said aluminosilicate hydrogel binder has compositional limits, exclusive of its water content, of from 10-60 weight percent total alkali, 10-70 weight percent alumina and 10-80 weight percent silica, and controlling the setting rate of the composition by maintaining the mole ratio of alumina-to-silica at from 0.07 to about 4.20, the composition having a total solids content of said binder of 10-50 weight percent, the balance essentially water.

19. The method of preparing said rigidified formed articles as defined in claim 18, wherein said first and second steps are effected in a two-stage, high-intensity mixing and rapid dispensing apparatus.

20. The method of preparing said rigidified formed articles as defined in claim 18, wherein said aggregate-containing slurries of said first step are simultaneously sprayed together to effect concurrent mixing thereof and formation of said articles.

21. The method of preparing formed articles of aggregate/binder compositions according to claim 1 wherein said method comprises:
as a first step, preparing separate silicate-containing and aluminate-containing solutions, respectively, which when combined react to produce an aluminosilicate hydrogel binder that is self-setting under ambient conditions, and
as a second step, preparing a mass of aggregate material and simultaneously spraying said silicate and aluminate containing solutions into admixture with said aggregate mass to effect homogeneous mixture thereof;
wherein said aggregate consists essentially of discrete particulate matter which when bound together in said rigidified condition constitutes the skeletal base of said articles and
wherein said aluminosilicate hydrogel binder has composition limits, exclusive of its water content, of from 10-60 weight percent total alkali, 10-70 weight percent alumina and 10-80 weight percent silica, and controlling the setting rate of the composition by maintaining the mole ratio of alumina-to-silica at from 0.07 to about 4.20, the composition having a total solids content of said binder of 10-50 weight percent, the balance essentially water.

22. The method as disclosed in claim 21, wherein the aggregate mass is simultaneously sprayed with said silicate and aluminate containing solutions to effect the homogeneous mixing thereof when forming said articles.

23. The method of preparing rigidified formed shapes as defined in claim 18, wherein the initial composition comprises:
50 pbw coarse mullite
30 pbw aluminosilicate hydrogel binder
(42% solids)
10 pbw calined kaolin clay
10 pbw finely ground mullite
said method further including the steps of air curing compacts formed of said composition and then leaching them in flowing water to remove excess sodium ions,
placing the compacts in a calcium or aluminum chloride bath to effect exchange of calcium or aluminum ions for sodium ions,
rinsing the compacts to remove trapped soluble chlorides, air curing and then baking the compacts to provide ceramic products usable up to a temperature range of 2300°-2500°F.

* * * * *

UNITED STATES PATENT AND TRADEMARK OFFICE
CERTIFICATE OF CORRECTION

PATENT NO. : 4,432,798
DATED : Feb. 21, 1984
INVENTOR(S) : Richard L. Helferich and William B. Shook It is certified that error appears in the above-identified patent and that said Letters Patent are hereby corrected as shown below:

| | |
|---|---|
| Column 2, Line 11, | "chemistry" should be --Chemistry--; |
| Column 3, Line 11, | "bnder" should be --binder--; |
| Column 4, Line 30, | "bondered" should be --bonded--; |
| Column 4, Line 54, | "gets" should be --gels--; |
| Column 5, Line 34, | "non-pollting" should be --non-polluting-- |
| Column 5, Line 47, | "soidum" should be --sodium--; |
| Column 6, Line 47, | "/-" should be --/--; |
| Column 7, Line 55, | "hydrogen" should be --hydrogel--; |
| Column 7, Line 60, | "synersis" should be --syneresis--; |
| Column 10, Line 61, | "table" should be --Table--; |
| Column 18, Line 20, | "metals of the period" should be --metals of the Period Table of Elements--; |
| Column, 19, Line 50, | "suitabletemperature" should be --suitable temperature--. |

Signed and Sealed this

Nineteenth Day of June 1984

[SEAL]

Attest:

GERALD J. MOSSINGHOFF

Attesting Officer

Commissioner of Patents and Trademarks